(12) United States Patent
Des Roches-Dionne et al.

(10) Patent No.: US 11,059,567 B2
(45) Date of Patent: Jul. 13, 2021

(54) METHOD OF CONTROLLING A PROPELLER WITH TWO-POSITION SOLENOID

(71) Applicant: PRATT & WHITNEY CANADA CORP., Longueuil (CA)

(72) Inventors: Nicolas Des Roches-Dionne, Longueuil (CA); Gabriel Meunier, Saint-Bruno-de-Montarville (CA); Sylvain Lamarre, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 127 days.

(21) Appl. No.: 16/418,467

(22) Filed: May 21, 2019

(65) Prior Publication Data
US 2020/0369370 A1 Nov. 26, 2020

(51) Int. Cl.
*B64C 11/40* (2006.01)
*B64C 11/38* (2006.01)

(52) U.S. Cl.
CPC ............ *B64C 11/40* (2013.01); *B64C 11/385* (2013.01)

(58) Field of Classification Search
CPC ......... B64C 11/30–44; F01D 7/00; F01D 7/02
See application file for complete search history.

(56) References Cited

U.S. PATENT DOCUMENTS 2,669,312 A * 2/1954 Dinsmore ............... F02D 29/00
416/35
2,754,921 A * 7/1956 Dinsmore ............. B64C 11/305
416/35

(Continued)

FOREIGN PATENT DOCUMENTS

| EP | 0394181 | 10/1990 |
| EP | 3434585 | 1/2019 |
| FR | 2985284 | 7/2013 |

OTHER PUBLICATIONS

CAST. Propeller Operation and Malfunctions Basic Familiarization for Flight Crews. Accessed from https://www.cast-safety.org/pdf/4_propeller_fundamentals.pdf on Nov. 20, 2020. Available as of at least Aug. 7, 2015 (Year: 2015).*

*Primary Examiner* — Igor Kershteyn
*Assistant Examiner* — Topaz L. Elliott
(74) *Attorney, Agent, or Firm* — Norton Rose Fulbright Canada LLP (57) ABSTRACT

A method for controlling an aircraft propeller is provided that comprises obtaining a measurement of a speed of the propeller, comparing the propeller speed to a first threshold, responsive to determining that the propeller speed exceeds the speed threshold, outputting a valve control signal for opening a two-position solenoid valve coupled to the propeller, the two-position solenoid valve configured for controlling fluid flow to and from the propeller to control propeller blade angle, computing a rate of change of the propeller speed, comparing the rate of change of the propeller speed to a second threshold, and responsive to determining that the rate of change of the propeller speed is below the second threshold, outputting the valve control signal for closing the two-position solenoid valve. A system for controlling an aircraft propeller and an aircraft propeller control assembly are also provided.

17 Claims, 5 Drawing Sheets

(56) References Cited

U.S. PATENT DOCUMENTS

| | | | | |
|---|---|---|---|---|
| 2,857,007 | A | * | 10/1958 | Detamore ............. B64C 11/306 |
| | | | | 416/34 |
| 4,993,919 | A | * | 2/1991 | Schneider ............. B64C 11/303 |
| | | | | 415/17 |
| 5,019,006 | A | * | 5/1991 | Schneider ............... B64C 11/40 |
| | | | | 416/35 |
| 5,037,271 | A | | 8/1991 | Duchesneau et al. |
| 5,174,718 | A | | 12/1992 | Lampeter et al. |
| 5,299,911 | A | | 4/1994 | Moriya |
| 5,997,250 | A | | 12/1999 | Carter, Jr. et al. |
| 6,422,816 | B1 | | 7/2002 | Danielson |
| 2018/0334242 | A1 | * | 11/2018 | Pedrami ................ B64C 11/385 |
| 2020/0262542 | A1 | * | 8/2020 | Meunier .................. F01D 7/00 |

* cited by examiner

METHOD OF CONTROLLING A PROPELLER WITH TWO-POSITION SOLENOID

TECHNICAL FIELD

The present disclosure relates generally to engines, and more specifically to propeller control of aircraft engines.

BACKGROUND OF THE ART

Constant speed propellers are controlled by varying blade angles to maintain the speed of the propeller at a reference speed. In order to do so, the blade angle is increased with increasing aircraft power and speed and decreased with decreasing aircraft power and speed. Varying the blade angle is achieved by either adding or removing oil in the propeller dome.

The primary means of adding or removing oil to the propeller is through a proportional valve that controls precisely the oil flow to maintain constant speed of the propeller. A backup mode of controlling oil flow to the propeller, sometimes used when the primary mode fails, is to use an overspeed governor, which removes oil from the propeller dome proportionally to the propeller overspeed. However, use of the overspeed governor proves costly and increases the weight of the overall system.

Therefore, improvements are needed.

SUMMARY

In accordance with a broad aspect, there is provided a method for controlling an aircraft propeller, the method comprising obtaining a measurement of a speed of the propeller, comparing the propeller speed to a first threshold, responsive to determining that the propeller speed exceeds the speed threshold, outputting a valve control signal for opening a two-position solenoid valve coupled to the propeller, the two-position solenoid valve configured for controlling fluid flow to and from the propeller to control propeller blade angle, computing a rate of change of the propeller speed, comparing the rate of change of the propeller speed to a second threshold, and responsive to determining that the rate of change of the propeller speed is below the second threshold, outputting the valve control signal for closing the two-position solenoid valve.

In some embodiments, the method further comprises computing the second threshold based on a previous rate of change of propeller speed recorded upon opening of the two-position solenoid valve.

In some embodiments, the second threshold is computed by multiplying the recorded rate of change with a predetermined ratio.

In some embodiments, the first threshold is set at a value to prevent overspeed.

In some embodiments, the valve control signal is output for controlling the two-position solenoid valve comprising a feather solenoid valve.

In some embodiments, the rate of change of propeller speed is continuously computed.

In accordance with another broad aspect, there is provided a system for controlling an aircraft propeller, the system comprising a processing unit and a non-transitory computer-readable storage medium having stored thereon program instructions executable by the processing unit for obtaining a measurement of a speed of the propeller, comparing the propeller speed to a first threshold, responsive to determining that the propeller speed exceeds the speed threshold, outputting a valve control signal for opening a two-position solenoid valve coupled to the propeller, the two-position solenoid valve configured for controlling fluid flow to and from the propeller to control propeller blade angle, computing a rate of change of the propeller speed, comparing the rate of change of the propeller speed to a second threshold, and responsive to determining that the rate of change of the propeller speed is below the second threshold, outputting the valve control signal for closing the two-position solenoid valve.

In some embodiments, the program instructions are further executable by the processing unit for computing the second threshold based on a previous rate of change of propeller speed recorded upon opening of the two-position solenoid valve.

In some embodiments, the program instructions are further executable by the processing unit for computing the second threshold by multiplying the recorded rate of change with a predetermined ratio.

In some embodiments, the program instructions are further executable by the processing unit for comparing the propeller speed to the first threshold set at a value that prevents overspeed.

In some embodiments, the two-position solenoid valve is a feather solenoid valve.

In accordance with yet another broad aspect, there is provided an aircraft propeller control assembly comprising an aircraft propeller, an actuator coupled to the aircraft propeller and comprising a two-position solenoid valve for controlling fluid flow to and from the aircraft propeller to control propeller blade angle, and a controller coupled to the actuator and configured for obtaining a measurement of a speed of the propeller, comparing the propeller speed to a first threshold, responsive to determining that the propeller speed exceeds the speed threshold, outputting a valve control signal for opening the two-position solenoid valve, computing a rate of change of the propeller speed, comparing the rate of change of the propeller speed to a second threshold, and responsive to determining that the rate of change of the propeller speed is below the second threshold, outputting the valve control signal for closing the two-position solenoid valve.

In some embodiments, the controller is configured for computing the second threshold based on a previous rate of change of propeller speed recorded upon opening of the two-position solenoid valve.

In some embodiments, the controller is configured for computing the second threshold by multiplying the recorded rate of change with a predetermined ratio.

In some embodiments, the controller is configured for comparing the propeller speed to the first threshold set at a value that prevents overspeed.

In some embodiments, the two-position solenoid valve is a feather solenoid valve.

In some embodiments, the controller is a secondary means of controlling the propeller and is enabled upon failure of a primary means.

In some embodiments, the controller is a primary means of controlling the propeller.

In some embodiments, the aircraft propeller is a single-acting propeller.

In some embodiments, the aircraft propeller is a double-acting propeller.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
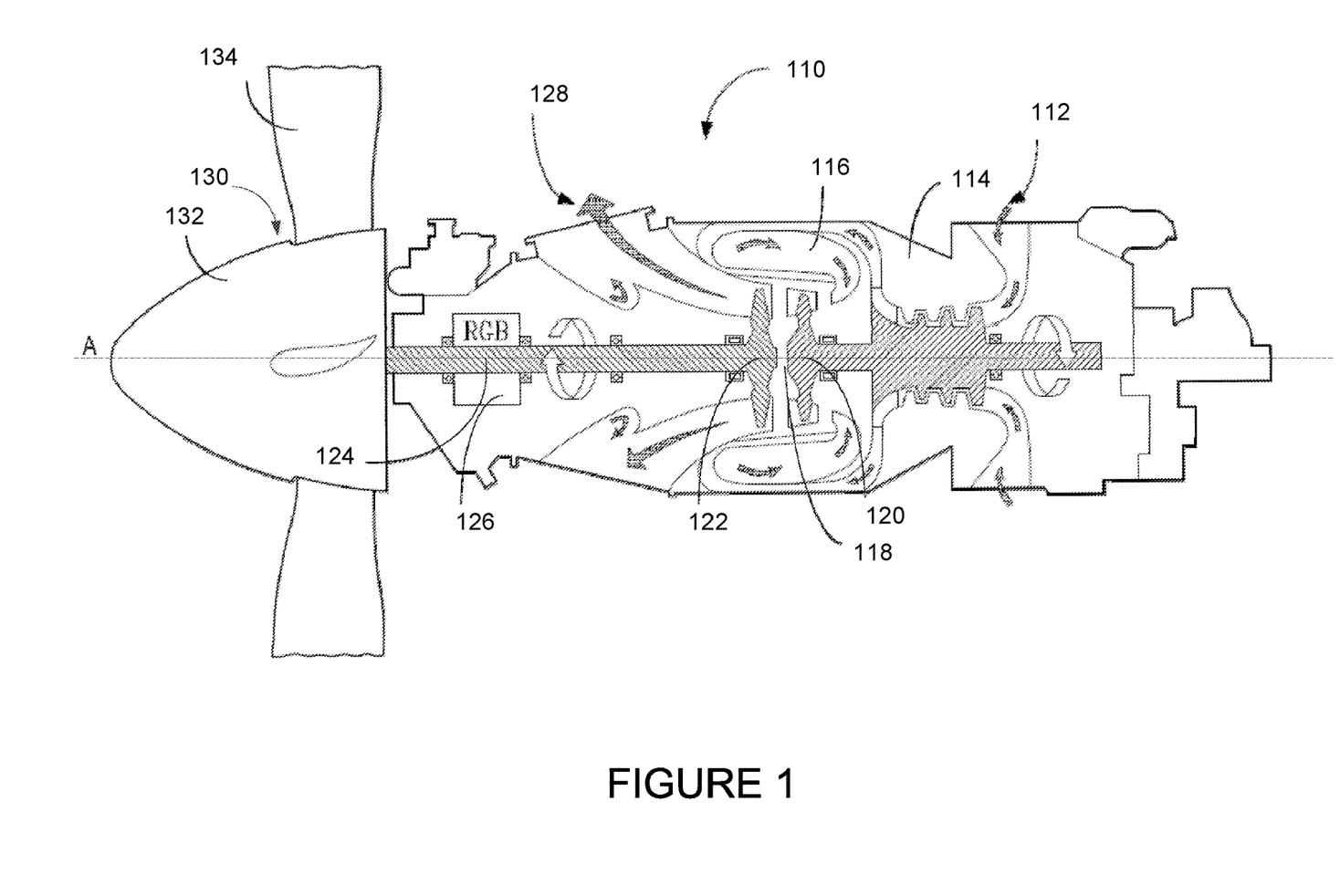
FIG. 1 is a schematic cross-sectional view of an engine, in accordance with one or more illustrative embodiments.

FIG. 1 depicts an exemplary engine 110. The engine 110 may be any suitable aircraft propulsion system, and may include in some embodiments a hybrid-electric propulsion system or an all-electric propulsion system. The engine may be found in aircraft as well as for other industrial applications, such as for compressor drivers, ship propulsion and electric power, and locomotives. In one embodiment, the engine 110 which is a gas turbine engine of a type typically provided for use in subsonic flight. In this embodiment, the engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to the hub 132 by any suitable means and extending radially therefrom. The blades 134 are also each rotatable about their own radial axes through a plurality of blade angles, which can be changed to achieve modes of operation, such as feather, full reverse, and forward thrust.

The propeller 130 converts rotary motion from the engine 110 to provide propulsive force to the aircraft. Propeller 130 is a constant speed propeller, meaning that it is designed to automatically change its blade angle (or blade pitch) to allow it to maintain a constant rotational speed, regardless of the amount of engine torque being produced, the speed of the aircraft, or the altitude at which the aircraft is flying. Other configurations for a turboprop engine may also apply.

Figure 2:
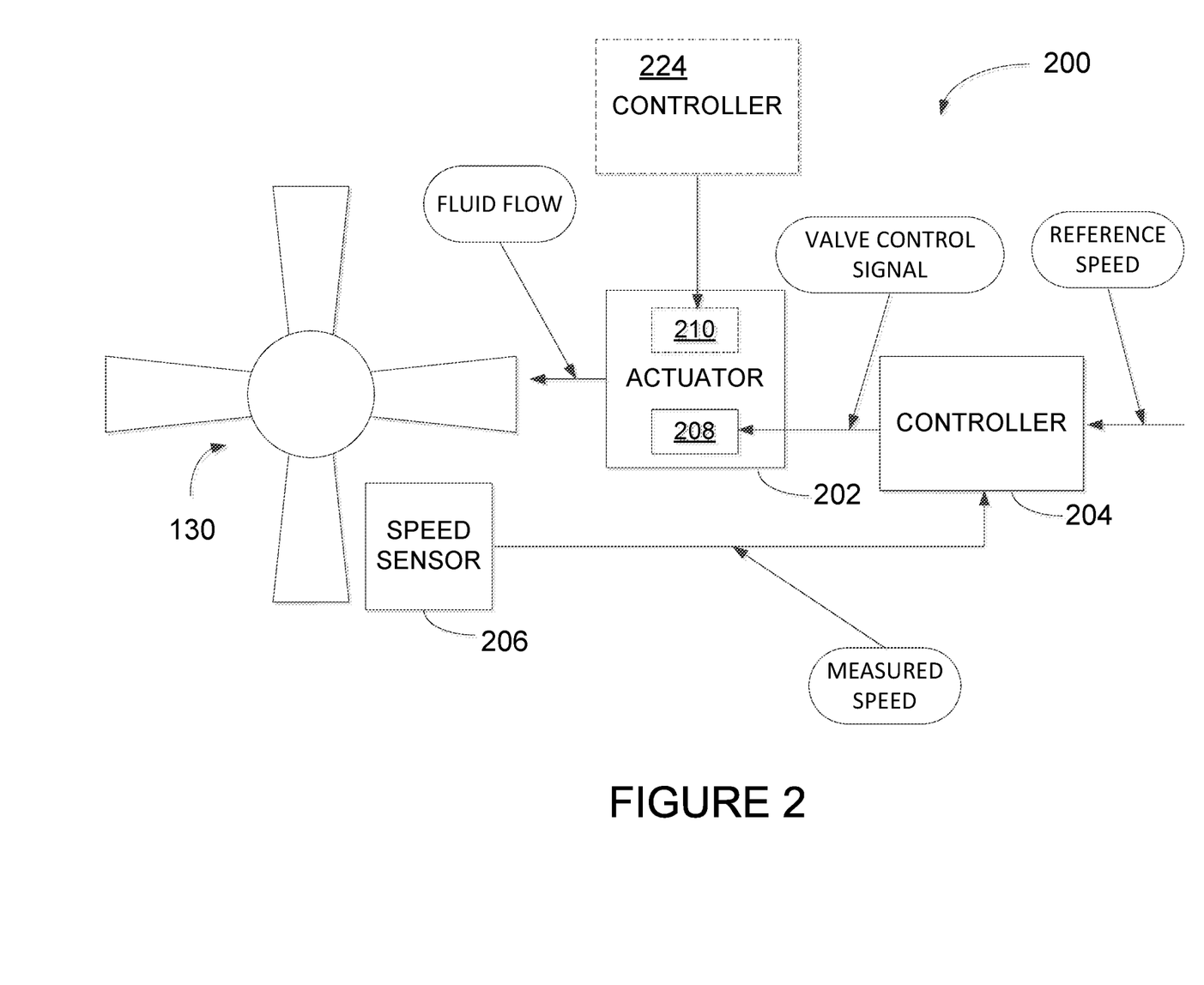
FIG. 2 is a schematic diagram of an example embodiment of a propeller control assembly.

Referring to FIG. 2, there is illustrated an example embodiment of a propeller control assembly 200. A controller 204 receives a reference speed to which the propeller 130 is to be set. The controller 204 regulates fluid flow, such as oil, to the propeller 130 via an actuator 202 in accordance with the reference speed. A valve control signal is transmitted by the controller 204 to the actuator 202 and the actuator 202 responds by regulating fluid flow to the propeller 130 accordingly.

One or more sensors 206 provide the controller 204 with the propeller's actual speed as measured. When the propeller's actual speed deviates from the reference speed, the controller 204 responds with a change in blade angle. The actuator 202 is commanded to direct fluid under pressure to the propeller 130 or to release (i.e. remove) fluid from the propeller 130. The change in fluid volume going to the propeller 130 changes the blade angle and modifies the propeller speed.

The actuator 202 may regulate fluid flow to and from the propeller 130 via a two-position solenoid valve 208. The two-position solenoid valve 208 may be used as a secondary means of controlling the speed of the propeller 130 in case of failure of a primary means, such as a proportional valve 210 (also referred to as a Propeller Control Unit or PCU), which is controlled by a separate controller 224 via a separate valve control signal. It should however be understood that, in some embodiments, the two-position solenoid valve 208 may be used as a primary means of propeller control. The two-position solenoid valve 208 can be actuated between a closed position and an open position to selectively allow or prevent fluid flow (i.e. add or remove fluid) to and from the propeller 130. In some embodiments, the two-position solenoid valve 208 is a feathering solenoid valve, used to initiate feathering of the propeller 130. When the feathering solenoid is energized, it allows fluid to flow out of the propeller dome until the propeller 130 is completely feathered, provided the feathering solenoid is maintained energized. Alternatively, the two-position solenoid valve 210 is a separate valve independent of the feathering solenoid.

Although FIG. 2 shows two separate controllers 204 and 224, it should be understood that a single controller may be used to implement the control logic or functions of controllers 204 and 224.

Figure 3:
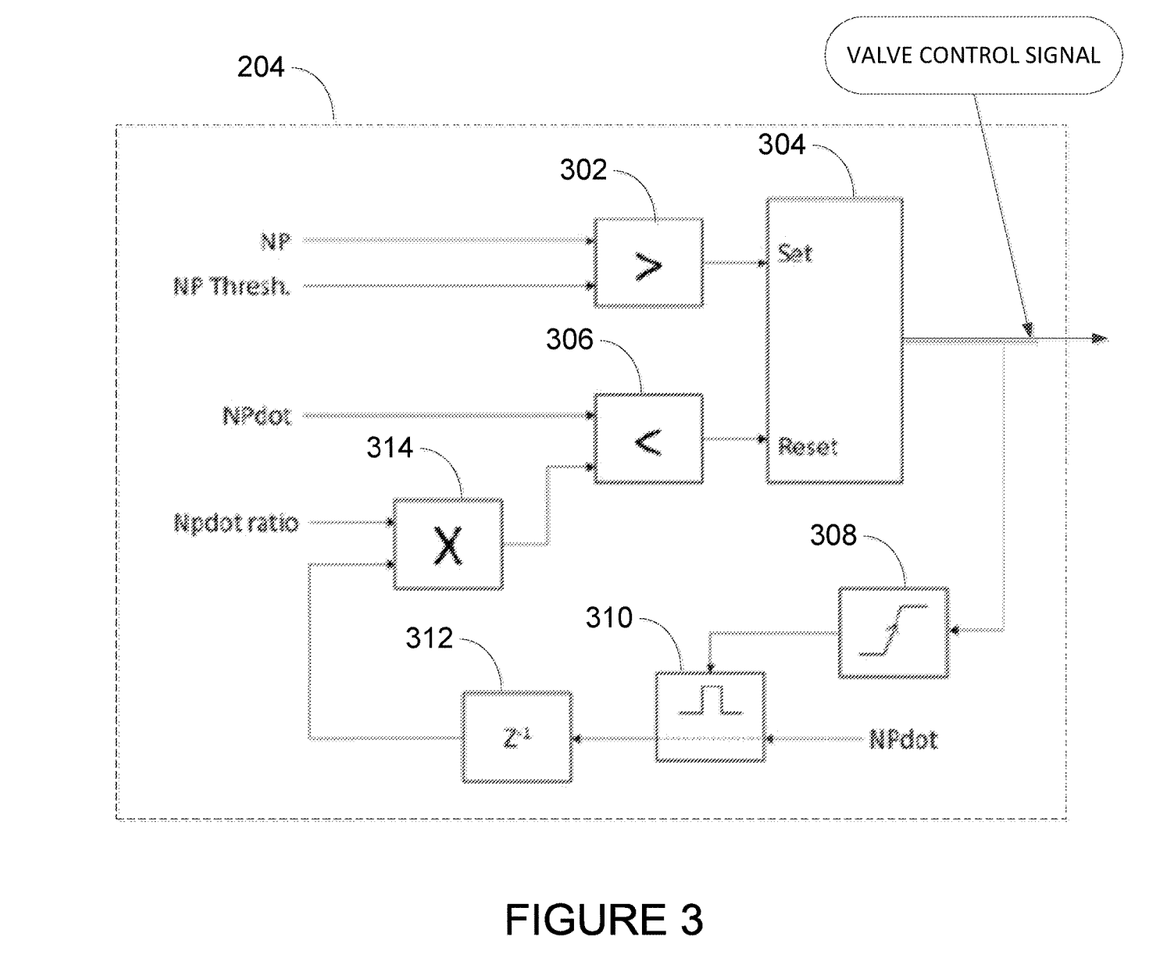
FIG. 3 is a block diagram of a control logic embedded into a controller from the propeller control assembly of FIG. 2, in accordance with an embodiment.

Referring to FIG. 3, there is illustrated an example embodiment of the controller 204. The controller 204 may take any suitable form. In the illustrated embodiment, the controller 204 acquires a measurement of an actual speed ($N_P$) of the propeller (reference 130 in FIG. 1). The propeller speed may be measured by the speed sensor (reference 206 in FIG. 2), as discussed above, and the controller 204 may accordingly receive a propeller speed signal indicative of the actual propeller speed. The controller 204 then uses a comparator 302 to compare the actual propeller speed to a predetermined speed threshold ($N_P$ Thresh). The speed threshold may be obtained by any suitable means, e.g. retrieved from a database, a memory, or other storage medium to which the controller 204 may be communicatively coupled. The value of the speed threshold may depend on engine configuration. The speed threshold is illustratively set to protect the engine (reference 110 in FIG. 1) from overspeeding. In one embodiment where the turbine section 118 of the engine 110 has a different overspeed limit than the propeller 130, the speed threshold may be set in order to protect against overspeeding when the lowest limit is reached.

When it is determined that the propeller speed is above the speed threshold, the output of the comparator 302 is set to 'TRUE' or logical one ('1') and this value is sent to the 'SET' input of a latch 304, causing the latch 304 to be set. When the latch 304 is set, a valve control signal comprising instructions to activate or energize (i.e. open) the two-position solenoid valve (reference 208 in FIG. 2) is output. When the two-position solenoid valve 208 is opened, it allows fluid to flow out of the propeller dome. As a result, the speed of the propeller 130 is controlled by varying the blade angles and propeller overspeed can be prevented.

Figure 4:
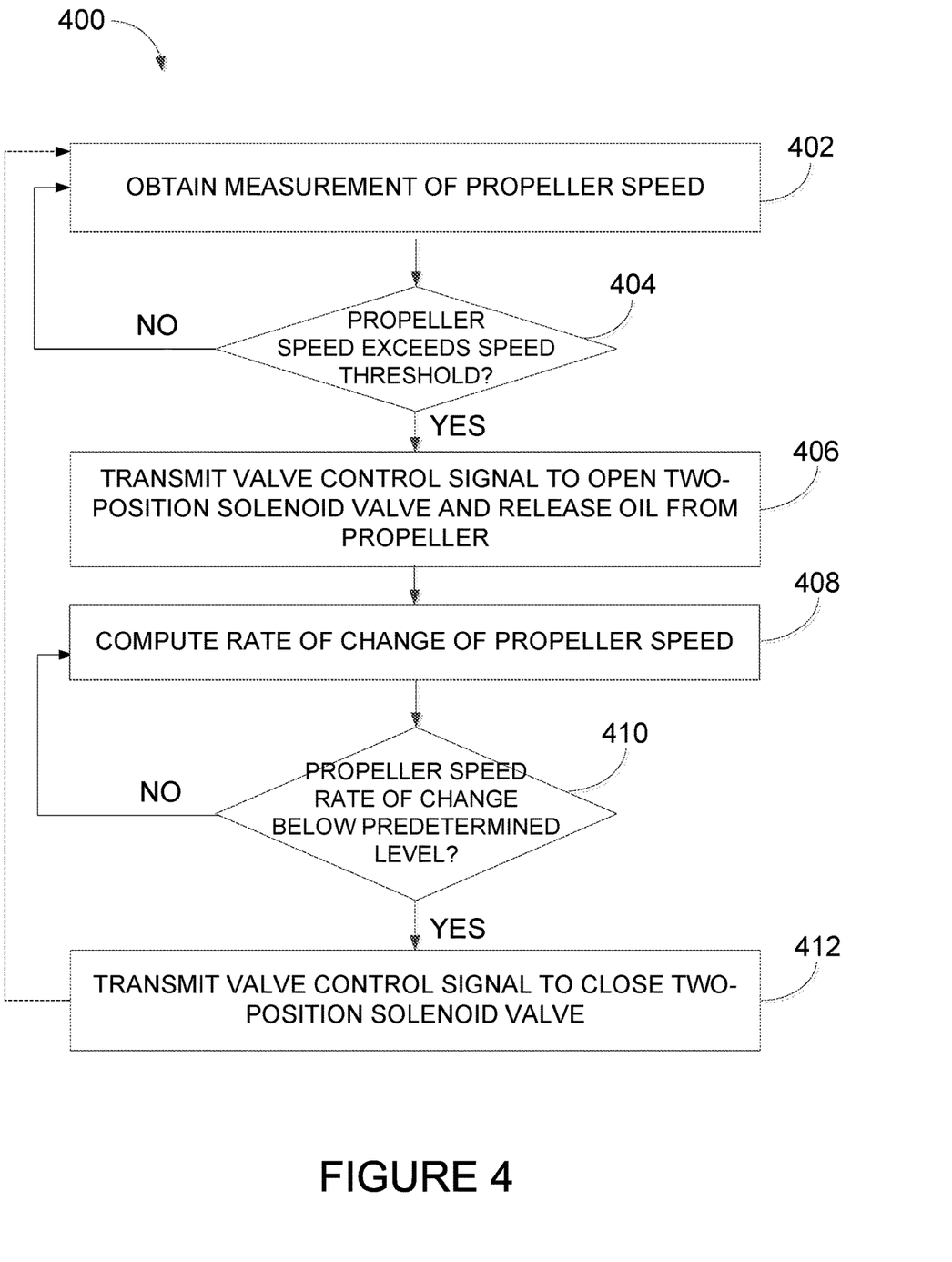
FIG. 4 is a flowchart of a method for controlling a propeller, in accordance with one embodiment.

In order to avoid overtorque, it is desirable for the two-position solenoid valve 208 to be closed as soon as the blade angle has changed and the propeller speed has decreased sufficiently to prevent overspeed. In order to control the duration of time for the two-position solenoid valve 208 to open and ensure that the two-position solenoid valve 208 is de-activated or de-energized (i.e. closed) at the appropriate time, the controller 204 computes the rate of change of the propeller speed ($N_{Pdot}$). Although FIG. 4 illustrates (for clarity purposes) that the rate of change is computed after the two-position solenoid valve 208 has been opened, it should be understood that the rate of change of propeller speed is in fact computed continuously, whether the vale is opened or closed. For this purpose, the controller 204 may comprise a derivative unit (not shown) configured to compute the derivative of the actual propeller speed, as obtained from the propeller speed signal. A rate of change signal indicative of the computed derivative (i.e. the rate of change of propeller speed) may be output accordingly.

The controller 204 then uses a comparator 306 to compare the rate of change signal to a predetermined rate of change level. When it is determined that the rate of change of propeller speed is below the predetermined rate of change level, the output of the comparator 306 is set to 'TRUE' or '1' and this value is sent to the 'RESET' input of latch 304, causing the latch 304 to be reset. When the latch 304 is reset, a valve control signal comprising instructions to de-activate or de-energize (i.e. close) the two-position solenoid valve 208 is output. When the two-position solenoid valve 208 is closed, fluid is directed into the propeller 130 to further modify the propeller speed by varying the blade angles. In this manner, precise control of propeller speed may be achieved.

In one embodiment, the controller 204 determines the predetermined rate of change level based on a previously stored value of the rate of change of propeller speed, the previously stored value recorded the last time the two-position solenoid valve 208 was opened. In particular, the predetermined rate of change level is illustratively determined by computing a given ratio of the previously stored value of the rate of change of propeller speed. In one embodiment, the previous value of the rate of change of propeller speed is stored when the propeller speed reaches a value that exceeds the speed threshold. As shown in FIG. 3, the output of the latch 304 is illustratively fed to a rising edge detection unit 308. When the output of the latch 304 switches from its default value of logical zero ('0') to '1' (upon the propeller speed exceeding the speed threshold), the output of the rising edge flag detection unit is set to 'TRUE'. The previously stored value of the rate of change of propeller speed is then obtained by assigning the rate of change signal to an assigning unit 310 and computing the previous cycle of the assigned rate of change signal using a last pass unit 312. A multiplier 314 is then used to multiply the previously stored value of the rate of change of propeller speed, as computed and output by the last pass unit 312, with the given ratio (Npdot ratio). The given ratio may be a predetermined value retrieved from memory (e.g., a cache or other storage medium) and may vary depending on engine configurations. In one embodiment, the value of the ratio is determined experimentally, based on how quickly the propeller system (i.e. the propeller speed) is reacting to the opening of the feathering solenoid. The ratio may also vary as a function of other parameters, included but not limited to, altitude, temperature, and propeller speed, produced power. The selected ratio will be the ratio that ensures to reduce propeller speeds and limits undershoot. The output of the multiplier 314 (i.e. the ratio of the previously stored value of the rate of change of propeller speed) is then used as the predetermined rate of change level to which the rate of change of propeller speed is compared. This in turn allows to anticipate a situation in which the propeller slows down below an acceptable threshold.

It should be understood that the logic for determining the predetermined rate of change level is described above with reference to FIG. 3 in accordance with one embodiment. Any other suitable logic may be used to determine the predetermined rate of change level based on a previously stored value of the rate of change of propeller speed.

Referring now to FIG. 4, an example method 400 for controlling a propeller, in accordance with one embodiment, will now be described. The method 400 comprises obtaining at step 402 a measurement of an actual speed of the propeller. The actual speed measurement may be obtained, in real-time, from one or more sensors (e.g., speed sensor 206 in FIG. 2). The next step 404 is then to assess whether the actual propeller speed as measured exceeds a predetermined speed threshold. If this is not the case, the method 400 flows back to the step 402 of obtaining propeller speed measurement. Otherwise, if it is determined that the propeller speed exceeds the predetermined speed threshold, a valve control signal is transmitted at step 406 to activate (i.e. open) a two-position solenoid valve used to regulate fluid flow to and from the propeller 130. Activation of the two-position solenoid valve results in fluid being released from the propeller system to modify the propeller speed and accordingly prevent overspeed. Although not illustrated, it should be understood that step 406 also comprises recording the rate of change of propeller speed, which is referred to herein below as the previously stored value of the rate of change of propeller speed. In other words, the previous value of the rate of change of propeller speed is stored when it is determined (at step 404) that the propeller speed exceeds the speed threshold.

The rate of change of propeller speed is also computed at step 408. As previously mentioned, it should be understood that the rate of change of propeller speed may be continuously calculated. The next step 410 is then to assess whether the rate of change of propeller speed is below a predetermined rate of change level. In one embodiment, the predetermined rate of change level is determined based on a previously stored value of the rate of change of propeller speed, as discussed above with reference to FIG. 3. If the rate of change of propeller speed is not below a predetermined rate of change level, the method 400 flows back to step 408 to continuously monitor the rate of change of propeller speed. Otherwise, if it is determined that the rate of change of propeller speed is below the predetermined rate of change level, a valve control signal is transmitted at step 412 to de-activate (i.e. close) the two-position solenoid valve. In other words, the two-position solenoid valve is closed as soon as the rate of change of propeller speed decreases below the predetermined level (i.e. before the propeller slows down below a given threshold).

In some embodiments, the method 400 is iterative and a continuous valve control signal is built by flowing back to step 402 after step 412 has been performed. The method 400 may be used to compensate for failure of a primary means of propeller speed control.

It should be understood that the systems and methods described herein may apply to single-acting propeller systems (having counterweighted blades and a feather spring that constantly pushes the blades towards feather) or double-acting propeller systems (where the propeller governor control pressure on both sides of a piston to increase or decrease pitch as required).

From the above description, it can be seen that, in one embodiment, selective actuation of the two-position solenoid valve 208 may be used to achieve a required control over fluid flow within the propeller dome, thus allowing for control of the propeller speed and for prevention of propeller overspeed. The systems, methods, and assemblies for propeller control described herein may be used as a secondary control means for the propeller, in the event of failure of a primary control means (e.g., in the event of mechanical failure of the proportional valve 210).

Figure 5:
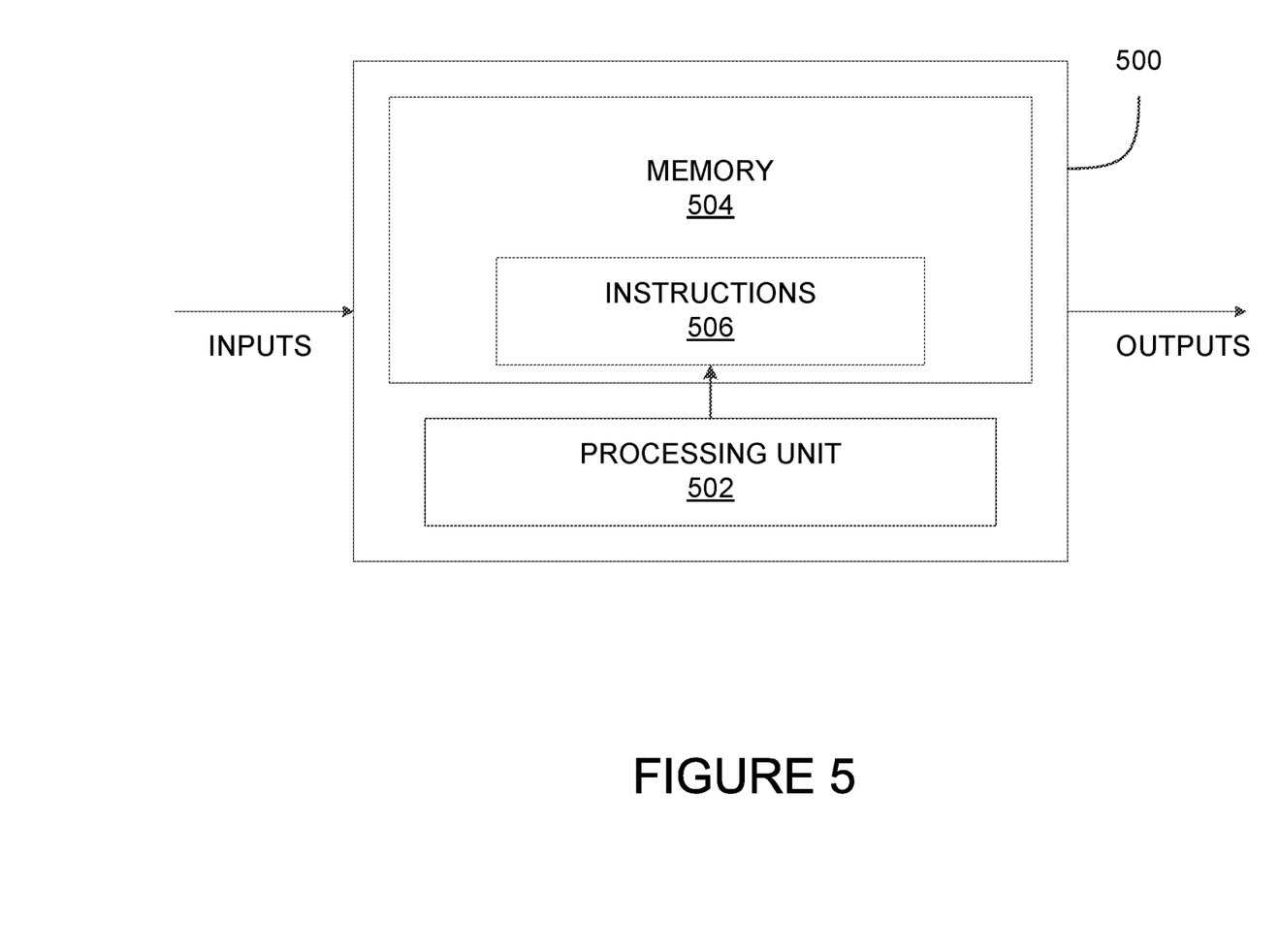
FIG. 5 is a block diagram of an example computing system for implementing the method of FIG. 4, in accordance with an embodiment, in accordance with one embodiment.

In some embodiments, the controller 204 of FIG. 3 is implemented by means of one or more computing devices 500, as illustrated in FIG. 5. The computing device 500 comprises a processing unit 512 and a memory 514 which has stored therein computer-executable instructions 516. The processing unit 512 may comprise any suitable devices configured to implement the method 400 such that instructions 516, when executed by the computing device 500 or other programmable apparatus, may cause the functions/acts/steps performed as part of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512. Note that the computing device 500 can be implemented as part of a full-authority digital engine controls (FADEC) or other similar device, including electronic engine control (EEC), engine control unit (EUC), electronic propeller control, propeller control unit, and the like.

The methods and systems as described herein may be implemented in a high level procedural or object oriented programming or scripting language, or a combination thereof, to communicate with or assist in the operation of a computer system, for example the computing device 8500. Alternatively, the methods and systems as described herein may be implemented in assembly or machine language. The language may be a compiled or interpreted language. Program code for implementing the methods and systems as described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems as described herein may also be considered to be implemented by way of a non-transitory computer-readable storage medium having a computer program stored thereon. The computer program may comprise computer-readable instructions which cause a computer, or more specifically the processing unit 512 of the computing device 500, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods as described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling an aircraft propeller, the method comprising:
obtaining a measurement of a speed of the propeller;
comparing the propeller speed to a speed threshold;
in responsive to determining that the propeller speed exceeds the speed threshold, outputting a valve control signal for opening a two-position solenoid valve coupled to the propeller, the two-position solenoid valve configured for controlling fluid flow to and from the propeller to control a blade angle of the propeller;
computing a rate of change of the propeller speed;
comparing the rate of change of the propeller speed to a rate of change threshold, the rate of change threshold computed based on a previous rate of change of the propeller speed recorded upon a last opening of the two-position solenoid valve; and in responsive to determining that the rate of change of the propeller speed is below the rate of change threshold, outputting the valve control signal for closing the two-position solenoid valve.

2. The method of claim 1, wherein the rate of change threshold is computed by multiplying the recorded rate of change with a predetermined ratio.

3. The method of claim 1, wherein the speed threshold is set at a value to prevent overspeed.

4. The method of claim 1, wherein the valve control signal is output for controlling the two-position solenoid valve comprising a feather solenoid valve.

5. The method of claim 1, wherein the rate of change of propeller speed is continuously computed.

6. A system for controlling an aircraft propeller, the system comprising:
 a processing unit; and
 a non-transitory computer-readable storage medium having stored thereon program instructions executable by the processing unit for:
  obtaining a measurement of a speed of the propeller;
  comparing the propeller speed to a speed threshold;
  in response to determining that the propeller speed exceeds the speed threshold, outputting a valve control signal for opening a two-position solenoid valve coupled to the propeller, the two-position solenoid valve configured for controlling fluid flow to and from the propeller to control a blade angle of the propeller;
  computing a rate of change of the propeller speed;
  comparing the rate of change of the propeller speed to a rate of change threshold, the rate of change threshold computed based on a previous rate of change of the propeller speed recorded upon a last opening of the two-position solenoid valve; and
  in response to determining that the rate of change of the propeller speed is below the rate of change threshold, outputting the valve control signal for closing the two-position solenoid valve.

7. The system of claim 6, wherein the program instructions are further executable by the processing unit for computing the rate of change threshold by multiplying the recorded rate of change with a predetermined ratio.

8. The system of claim 6, wherein the program instructions are further executable by the processing unit for comparing the propeller speed to the speed threshold set at a value to prevent overspeed.

9. The system of claim 6, wherein the two-position solenoid valve is a feather solenoid valve.

10. An aircraft propeller control assembly comprising:
 an aircraft propeller;
 an actuator coupled to the aircraft propeller and comprising a two-position solenoid valve for controlling fluid flow to and from the aircraft propeller to control a blade angle of the propeller; and
 a controller coupled to the actuator and configured for:
  obtaining a measurement of a speed of the propeller;
  comparing the propeller speed to a speed threshold;
  in response to determining that the propeller speed exceeds the speed threshold, outputting a valve control signal for opening the two-position solenoid valve;
  computing a rate of change of the propeller speed;
  comparing the rate of change of the propeller speed to a rate of change threshold, the rate of change threshold computed based on a previous rate of change of the propeller speed recorded upon a last opening of the two-position solenoid valve; and
  in response to determining that the rate of change of the propeller speed is below the rate of change threshold, outputting the valve control signal for closing the two-position solenoid valve.

11. The assembly of claim 10, wherein the controller is configured for computing the rate of change threshold by multiplying the recorded rate of change with a predetermined ratio.

12. The assembly of claim 10, wherein the controller is configured for comparing the propeller speed to the speed threshold set at a value to prevent overspeed.

13. The assembly of claim 10, wherein the two-position solenoid valve is a feather solenoid valve.

14. The assembly of claim 10, wherein the controller is a secondary means of controlling the propeller and is enabled upon failure of a primary means.

15. The assembly of claim 10, wherein the controller is a primary means of controlling the propeller.

16. The assembly of claim 10, wherein the aircraft propeller is a single-acting propeller.

17. The assembly of claim 10, wherein the aircraft propeller is a double-acting propeller.

* * * * *